(12) United States Patent
Manahan et al.

(10) Patent No.: US 7,685,595 B1
(45) Date of Patent: Mar. 23, 2010

(54) BROWSER-CONTROLLED INSTALLATION OF SOFTWARE ON REMOTE COMPUTER SYSTEM

(75) Inventors: Peter Ray Manahan, UxBridge (CA); Jason Robert McGee, Apex, NC (US); Barry Charles Searle, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/348,402

(22) Filed: Jan. 5, 2009

(51) Int. Cl.
*G06F 9/445* (2006.01)
(52) U.S. Cl. .................................................. 717/174
(58) Field of Classification Search ........................ None
See application file for complete search history.

(56) References Cited

U.S. PATENT DOCUMENTS

| | | | |
|---|---|---|---|
| 7,043,537 B1 * | 5/2006 | Pratt | 709/220 |
| 2003/0233483 A1 * | 12/2003 | Melchione et al. | 709/310 |
| 2007/0169114 A1 * | 7/2007 | Birk Olsen et al. | 717/174 |
| 2009/0204422 A1 * | 8/2009 | James et al. | 705/2 |

FOREIGN PATENT DOCUMENTS

CN 101034993 A 9/2007

OTHER PUBLICATIONS

Cameron Larid, "Lightweight Web Servers", Jul. 10, 2007, IBM Technical Library, retrieved from http://www.ibm.com/developerworks/web/library/wa-ltwebserv/ on Oct. 29, 2009.*

\* cited by examiner

*Primary Examiner*—Philip Wang
(74) *Attorney, Agent, or Firm*—Cahn & Samuels, LLP

(57) ABSTRACT

A method for a web browser-controlled installation of software on a remote computer system includes accessing at least one remote computer system; temporarily transferring a non-user interface, platform-independent installation program having an embedded web application and light-weight web server onto the at least one remote computer system, wherein the web application provides a web user interface; accessing a web browser and connecting to the light-weight web server via the web interface provided by the web application; providing instructions for installing software on the at least one remote computer to the web interface; the light-weight web server transferring the instructions to the non-user interface installation program; transferring and installing software on the at least one remote computer system; and removing the installation program, web application, and light-weight web server from the at least one remote computer.

1 Claim, 2 Drawing Sheets

BROWSER-CONTROLLED INSTALLATION OF SOFTWARE ON REMOTE COMPUTER SYSTEM

I. FIELD OF THE INVENTION

This invention relates to a system and method for a browser-controlled installation of software on a remote computer system.

II. BACKGROUND OF THE INVENTION

It is often necessary to install software on a remote computer system. However, a remote computer system may not have a convenient User Interface (UI) runtime (e.g., IBM z/OS servers). Thus, a typical installation program will not run since it cannot display a UI to query a user's selections and choices for the software installation.

One solution is to have a command line installation program which will execute a response file and run the installation. However, this approach can be error prone and is not a pleasant user experience. Further, this approach does not provide any UI to clarify errors or problem conditions.

Another solution is to have an installation UI run on one computer system, which interacts with the user and which communicates a resulting response file to a non-UI installation program on a remote computer system. This approach involves significant communications programming on both ends, and still suffers from a single response file interaction with the remote installation agent and installer. In addition, progress information and post-install interactions are extremely difficult to implement.

These solutions also may expose a system to a security risk, for example, by creating security holes in the remote computer system during or after software installation.

III. SUMMARY OF THE INVENTION

This invention provides a method for a browser-controlled installation of software on a remote computer system. At least one remote computer system is accessed. A non-user interface, platform-independent installation program having an embedded web application and light-weight web server are temporarily transferred onto the at least one remote computer system, wherein the web application provides a web user interface. A web browser is accessed and connects to the light-weight web server via the web interface provided by the web application. Instructions for installing software on the at least one remote computer are provided to the web interface. The light-weight web server transfers the instructions to the non-user interface installation program. Software is transferred and installed on the at least one remote computer system. The installation program, web application, and light-weight web server are removed from the at least one remote computer. The light-weight web server comprises a web server having about 100 to about 2,000 kilobytes.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and methods should become evident to a person of ordinary skill in the art.

IV. BRIEF DESCRIPTION OF THE DRAWINGS

V. DETAILED DESCRIPTION OF THE DRAWINGS

Figure 1:
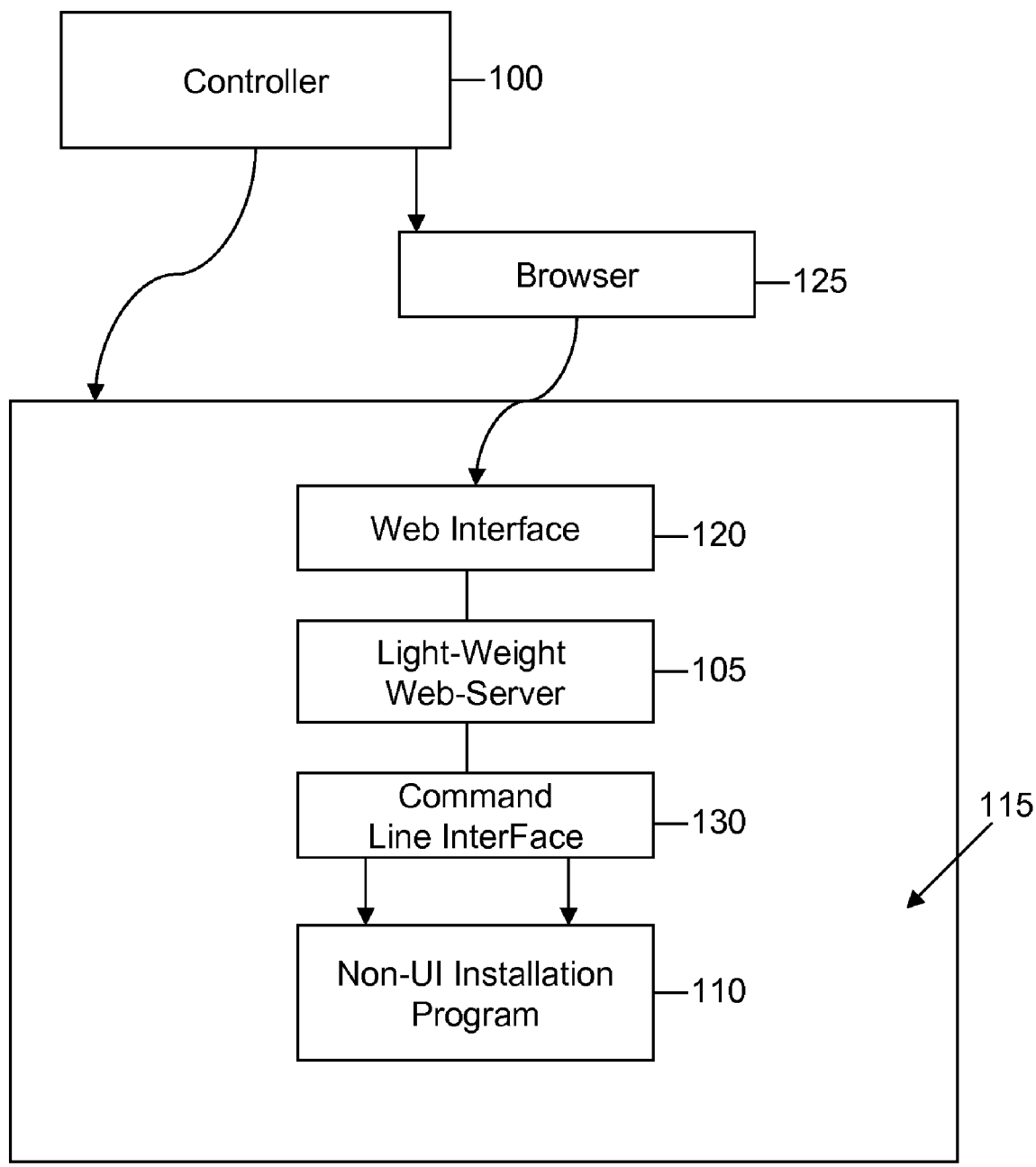
FIG. 1 is a process flow block diagram for a method of web browser-controlled remote software installation according to an embodiment of the present invention.
Figure 2:
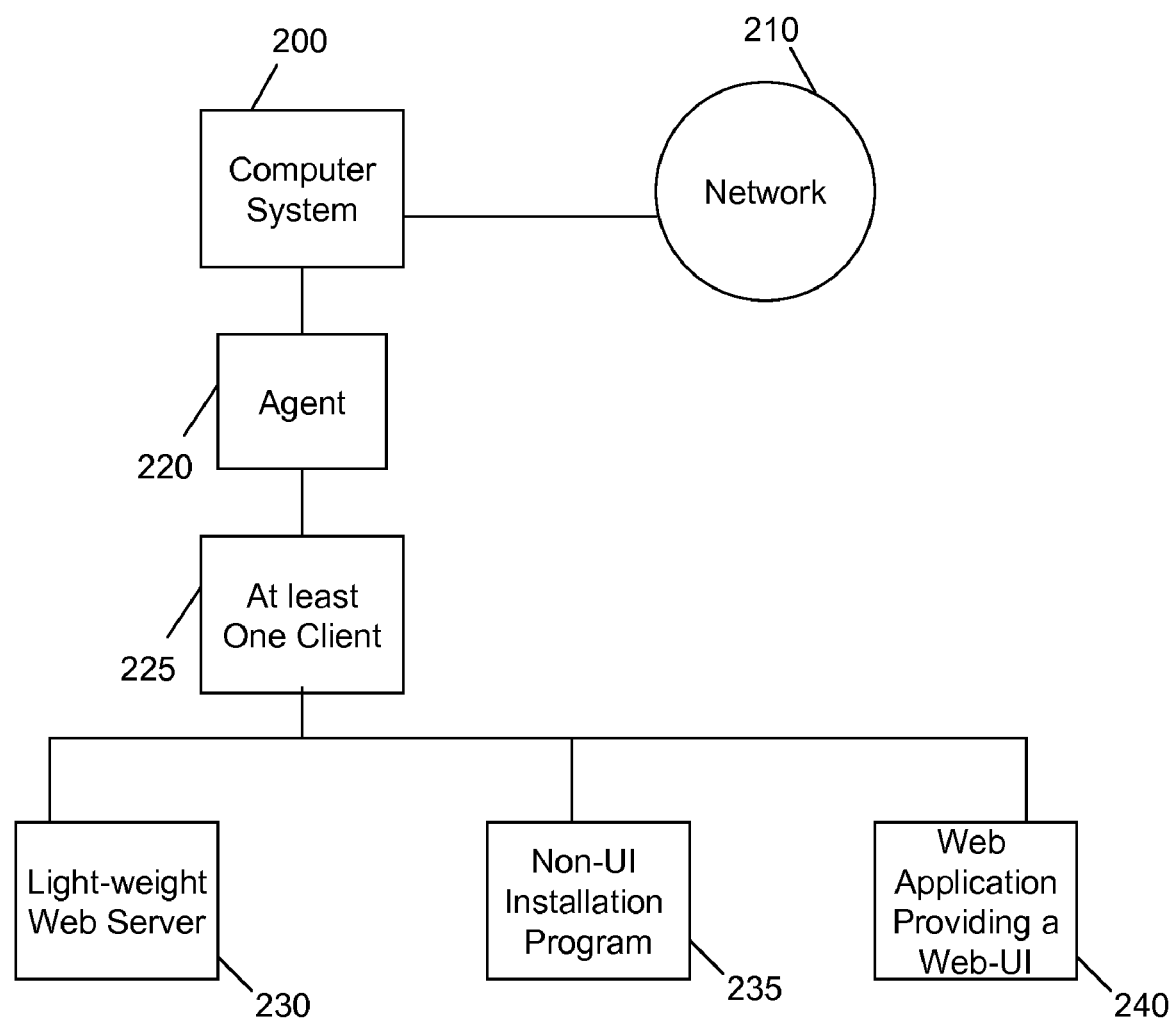
FIG. 2 is a system diagram for web browser-controlled remote software installation according to an embodiment of the present invention.

FIGS. 1-2 illustrate a system and method for a web browser-controlled installation of software on a remote computer system. In embodiments, the remote computer system may comprise at least one of a mainframe computer, middle-frame computer, server, desktop computer, or laptop computer. The present invention allows a user who wants to install software onto the at least one remote computer system to (1) log onto the remote computer system; (2) temporarily transfer an installation program, web application, and light-weight web server onto the remote computer system; and (3) start running the installation program and light-weight web server. After the software is transferred to and installed on the remote computer, the installation program, web application, and the light-weight web server may be removed from the remote computer.

According to the present invention, a small non-UI (headless) installation program is provided. In embodiments, the installation program is built using a platform-independent language such as JAVA™. However, the installation program may be built using a platform-dependent language, but then must be compiled into a platform-dependent program. The installation program provides an application program interface that may be driven by a command line response file or by a light-weight web server.

A web application and light-weight web server are embedded in the non-UI installation program, the web application running on the light-weight web server. The light-weight web server may comprise a web server being as small as about 100 to about 2,000 kilobytes (e.g., ProjectZero, Eclipse Jetty) since its purpose is to run the web application, and it should be small to be transferred quickly. The web application provides a web user interface that may be accessed by any web browser; runs on the light-weight web server; and invokes and interacts with the non-UI installation program, thereby passing on a user's software installation choices. In embodiments, the web UI may comprise an interface having static content (e.g., HTML) or an interface having dynamic content (e.g., Dojo, Web-2.0) and which minimizes browser dependencies.

Alternatively to a temporary transfer and start of the light-weight web server and web application upon demand, the light-weight web server and web application may be permanently left running as a background daemon service to support ongoing installations. However, this may impose an unnecessary processing load and provide a long-term security hole.

According to the present invention, a user may initiate the web browser-controlled remote installation process as discussed below. Upon authorization for accessing a remote computer system, for example by providing a user ID and password, the non-UI installation program, web application and light-weight web server will be temporarily installed on at least one remote computer system. Thus, using the standard web browser, a user may (1) connect to the light-weight web server via the web UI provided by the web application, (2) pass user software installation choices, (3) transfer the software to be installed, and (4) drive the software installation on the at least one remote computer system via the non-UI installation program.

In embodiments, using a remote installation process, a user may utilize a Transmission Control Protocol/Internet Protocol (TCP/IP) Secure Shell (SSH) execution program to temporarily install and start the light-weight web server, web application, and installation program on-demand on the remote computer system. Upon completion of a software installation, the light-weight web server, web application, and installation program may be removed or discarded from the remote computer system.

In other embodiments, a user wanting to install software on a computer system may locally install the light-weight web server, web application, non-UI installation program to a target computer, not remotely via the internet, but locally via a computer disk (CD) or via a file transfer protocol (e.g., via an image file), and then start that installation controller for remote control using a remote web-browser.

FIG. 1 is a process flow block diagram according to the present invention. As illustrated in the FIG. 1, a controller 100 initiates transfer, installation, and startup of light-weight web server 105 and non-UI installation program 110 (e.g., JAVA core), for example via SSH, on at least one remote computer system 115.

The light-weight web server 105 includes a web application providing a web-UI 120. Using a standard web browser 125, a user may access the web-UT 120 and transfer instructions via TCP/IP to the light-weight web server 105. The light-weight web server 105 directs the non-UT installation program 110 to install software, for example, via a Command Line Response File or Interface 130 on the at least one remote computer system 115.

FIG. 2 is a block diagram showing an illustrative system of the invention. The illustrative system includes at least one computer system 200 (e.g., server, a personal computer, laptop computer, notebook computer, cellular telephone, personal digital assistant or PDA, game device, MP3 player, television). The at least one computer system may be connected to a network 210 (e.g., the Internet, local area network (LAN), wide area network (WAN)). The system comprises an agent 220 for installing software on at least one remote computer system.

The agent 220 includes at least one client 225 comprising (1) a light-weight web server 230; (2) a platform-independent non-UI installation program 235; and (3) a web application providing a web-UI 240. The illustrative system is but one example, and one of ordinary skill in the art would recognize that many other variations may exist, all of which are contemplated by the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for a web browser-controlled installation of software on a remote computer system, comprising:
   accessing at least one remote computer system;
   temporarily transferring a non-user interface, platform-independent installation program having an embedded web application and light-weight web server onto the at least one remote computer system, wherein the web application provides a web user interface;
   accessing a web browser and connecting to the light-weight web server via the web interface provided by the web application;
   providing instructions for installing software on the at least one remote computer to the web interface; said light-weight web server transferring the instructions to the non-user interface installation program;
   transferring and installing software on the at least one remote computer system; and
   removing the installation program, web application, and light-weight web server from the at least one remote computer,
   wherein the light-weight web server comprises a web server having 100 to 2,000 kilobytes.

* * * * *